(12) United States Patent
Reeves (10) Patent No.: US 11,950,123 B2
(45) Date of Patent: Apr. 2, 2024

(54) AUTOMATED NETWORK STATE AUDITOR

(71) Applicant: T-Mobile USA, Inc., Bellevue, WA (US)

(72) Inventor: Raymond E. Reeves, Orlando, FL (US)

(73) Assignee: T-Mobile USA, Inc., Bellevue, WA (US)

( * ) Notice: Subject to any disclaimer, the term of this patent is extended or adjusted under 35 U.S.C. 154(b) by 100 days.

(21) Appl. No.: 17/562,824

(22) Filed: Dec. 27, 2021

(65) Prior Publication Data

US 2023/0209383 A1 Jun. 29, 2023

(51) Int. Cl.
| | |
|---|---|
| *H04W 24/02* | (2009.01) |
| *H04B 7/06* | (2006.01) |
| *H04L 41/0853* | (2022.01) |
| *H04W 24/10* | (2009.01) |

(52) U.S. Cl.
CPC .......... *H04W 24/10* (2013.01); *H04B 7/0626* (2013.01); *H04L 41/0853* (2013.01)

(58) Field of Classification Search
CPC ..... H04W 24/00; H04W 24/02; H04W 24/04; H04W 24/10; H04B 7/0626; H04L 41/085; H04L 41/0853; H04L 41/0866
See application file for complete search history.

(56) References Cited

U.S. PATENT DOCUMENTS

| | | |
|---|---|---|
| 7,231,330 B2 | 6/2007 | Hernandez-mondragon et al. |
| 7,623,504 B2 | 11/2009 | Phu |
| 8,279,810 B1 | 10/2012 | Li et al. |
| 8,423,637 B2 | 4/2013 | Vaswani et al. |
| 8,588,801 B2 | 11/2013 | Gorokhov et al. |
| 8,707,458 B2 | 4/2014 | Malaney |
| 8,769,308 B2 | 7/2014 | Mukherjee et al. |
| 8,861,494 B2 | 10/2014 | Mukhopadhyay |
| 8,938,525 B2 | 1/2015 | Magnusson et al. |
| 8,942,696 B2 | 1/2015 | Vukajlovic Kenehan et al. |
| 9,113,352 B2 | 8/2015 | Agarwal et al. |
| 9,154,987 B2 | 10/2015 | Redana et al. |
| 9,438,521 B2 | 9/2016 | Kazmi et al. |
| 9,615,304 B2 | 4/2017 | Breuer et al. |
| 9,661,441 B2 | 5/2017 | Da et al. |
| 9,661,585 B2 | 5/2017 | Boudreau et al. |
| 9,749,926 B2 | 8/2017 | Müller et al. |

(Continued)

FOREIGN PATENT DOCUMENTS

| | | |
|---|---|---|
| CN | 101932120 B | 9/2013 |
| CN | 103327526 B | 7/2017 |

(Continued)

*Primary Examiner* — Siu M Lee
(74) *Attorney, Agent, or Firm* — Perkins Coie LLP (57) ABSTRACT

Systems, methods, and devices that relate to an automated auditing system of the network conditions are disclosed. In one example aspect, a network device in a core network for wireless communication include one or more processors that are configured to determine an expected network state based on predefined configuration information of one or more network resources, receive measurement results reported by one or more wireless devices via at least one radio access node, estimate an actual network state based on the measurement results reported by one or more wireless devices, and detect a discrepancy between the expected network state and the actual network state.

20 Claims, 10 Drawing Sheets

(56) References Cited

U.S. PATENT DOCUMENTS

| | | | |
|---|---|---|---|
| 9,860,810 B2 | 1/2018 | Rahman et al. | |
| 9,924,389 B2 | 3/2018 | Siomina et al. | |
| 9,961,560 B2 | 5/2018 | Farkas et al. | |
| 10,034,189 B2* | 7/2018 | Futaki | H04W 28/18 |
| 10,057,802 B2 | 8/2018 | Gunnarsson et al. | |
| 10,075,466 B1 | 9/2018 | Oliphant et al. | |
| 10,111,123 B2 | 10/2018 | Rune et al. | |
| 10,194,343 B2 | 1/2019 | Breuer et al. | |
| 10,476,714 B2 | 11/2019 | Zhang et al. | |
| 10,506,543 B1 | 12/2019 | Edge et al. | |
| 10,743,276 B2* | 8/2020 | Papa | H04W 24/10 |
| 2006/0218271 A1 | 9/2006 | Kasslin et al. | |
| 2006/0253526 A1 | 11/2006 | Welch et al. | |
| 2013/0190006 A1 | 7/2013 | Kazmi et al. | |
| 2013/0303145 A1* | 11/2013 | Harrang | H04W 24/10 |
| | | | 455/418 |
| 2015/0195730 A1 | 7/2015 | Siomina et al. | |
| 2015/0319634 A1 | 11/2015 | Zwirn | |
| 2015/0358920 A1 | 12/2015 | Sorrentino et al. | |
| 2015/0373561 A1 | 12/2015 | Huang et al. | |
| 2016/0135132 A1* | 5/2016 | Donepudi | H04W 24/10 |
| | | | 370/311 |
| 2016/0219473 A1 | 7/2016 | Teyeb et al. | |
| 2016/0262111 A1 | 9/2016 | Boudreau et al. | |
| 2018/0234153 A1 | 8/2018 | Lincoln et al. | |
| 2019/0191293 A1 | 6/2019 | Nelson et al. | |
| 2019/0373301 A1 | 12/2019 | Gunasekara et al. | |
| 2020/0092685 A1 | 3/2020 | Fehrenbach et al. | |
| 2020/0128448 A1 | 4/2020 | Müller | |
| 2021/0105680 A1 | 4/2021 | Nilsson | |

FOREIGN PATENT DOCUMENTS

| | | |
|---|---|---|
| CN | 104272637 B | 10/2018 |
| EP | 3174329 B1 | 11/2020 |
| EP | 3764685 A1 | 1/2021 |

* cited by examiner

AUTOMATED NETWORK STATE AUDITOR

BACKGROUND

Mobile communication technologies are moving the world toward an increasingly connected and networked society. In the Fourth-Generation (4G)/Long-Term Evolution (LTE) wireless communication technology, techniques such as Carrier aggregation (CA) and beamforming have been used to increase the bandwidth. In the Fifth-Generation (5G) New Radio (NR) wireless technology, a variety of different frequency bands and connectivity modes are used to provide wide coverage and large bandwidths. Accurate alignment of the intended configurations and the actual deployment configurations of such technologies is needed to provide better user experiences.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

To provide high throughput, wider coverage, and optimal user experience to users, the actual deployment of the network resources (e.g., cell locations, antenna elements) needs to be accurately aligned with the intended configurations. However, conventionally, achieving such accuracy can be a challenging task—engineering teams need to be dispatched to the deployment sites frequently; a large amount of financial and time resources is needed to audit and correct unexpected deployment configurations. This patent document discloses techniques that can be implemented as an automated auditing system to determine if any discrepancy exists in the network system, thereby allowing pinpointed adjustment of resources so as to improve bandwidth and coverage for better user experiences. For example, the disclosed techniques can be implemented as a wireless communication method to determine n expected network state based on predefined configuration information of one or more network resources, receive measurement results reported by one or more wireless devices via at least one radio access node, estimate an actual network state based on the measurement results reported by one or more wireless devices, detect a discrepancy between the expected network state and the actual network state, and trigger an adjustment of the one or more network resources based on the discrepancy.

Figure 1A:
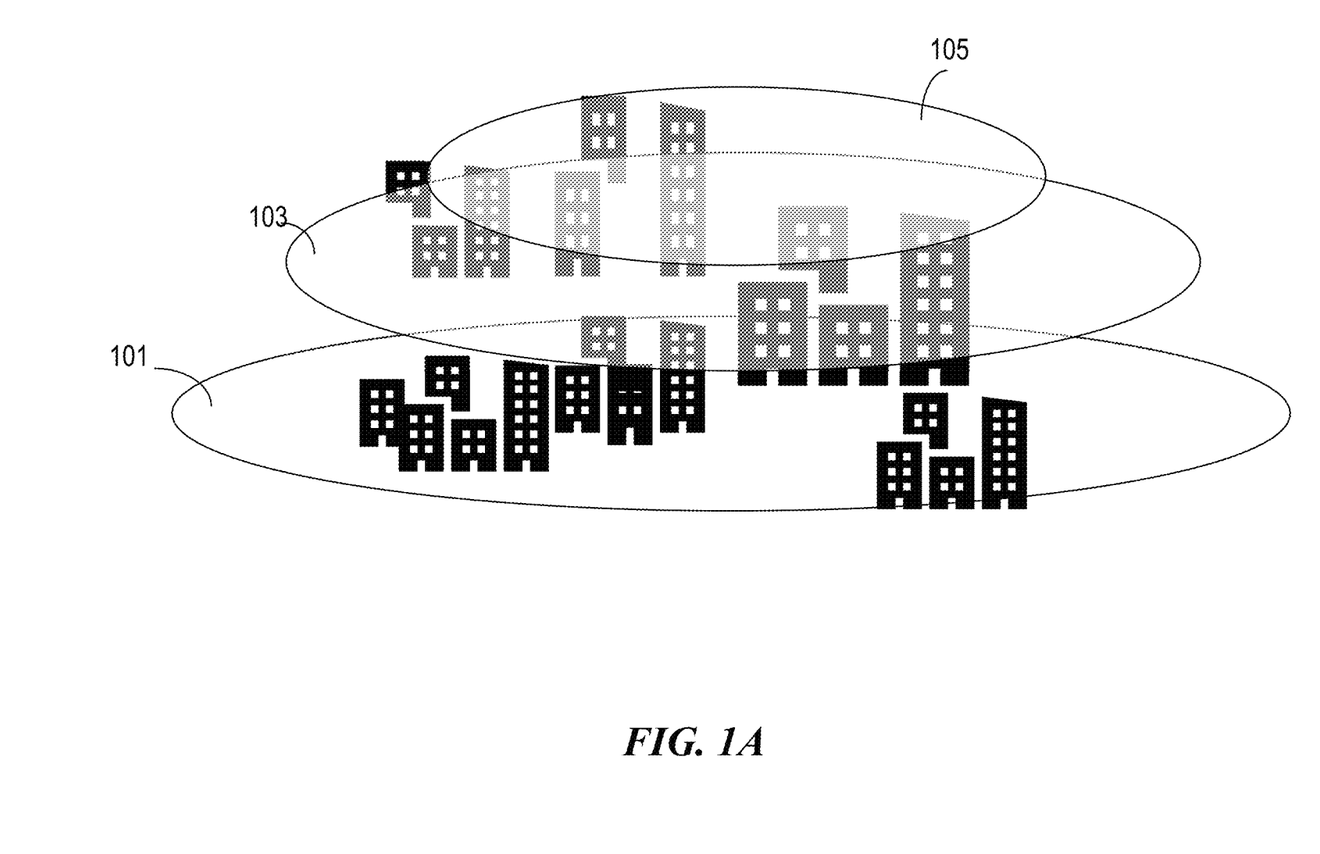
FIG. 1A illustrates an example of multiple frequency bands used in the Fifth-Generation (5G) Carrier Aggregation (CA).

In wireless communications, techniques such as carrier aggregation and beamforming have been adopted as the demand for throughput, improved user experience and wider coverage continues to increase. Carrier Aggregation (CA) provides the unique capability of aggregating several frequency bands for higher peak rates and increased cell coverage for the Fourth-Generation (4G) and the Fifth-Generation (5G) networks. FIG. 1A illustrates an example of multiple frequency bands used in 5G Carrier Aggregation. The low-band 101 is for wide coverage and indoor penetration at a lower frequency, the mid-band 103 is for higher bandwidth and capacity, and the high-band or millimeter wave delivers unprecedented peak rates and low latency but comes with smaller coverage areas. By aggregating different frequency bands when available, bandwidth and coverage can be both enhanced.

Figure 1B:
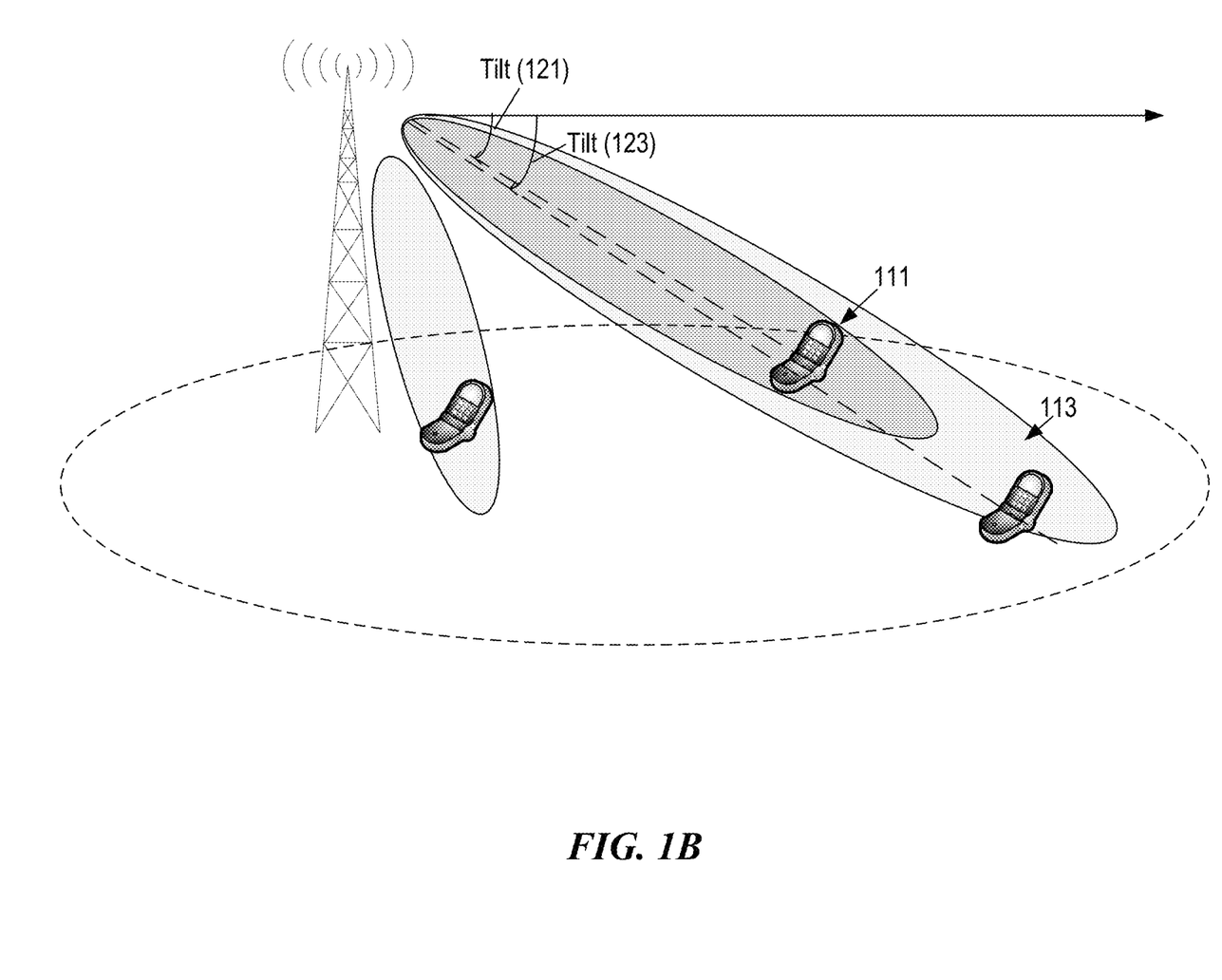
FIG. 1B illustrates an example of three-dimensional (3D) MIMO techniques that can be implemented in 5G beamforming.

Beamforming is the application of multiple radiating elements transmitting the signal at the same wavelength and phase to create a longer, more targeted signal in a specific direction. Multiple-In-Multiple-Out (MIMO) systems with a large number of antennas have drawn increased attention as they enable significant throughput and coverage improvement in communication networks. FIG. 1B illustrates an example of three-dimensional (3D) MIMO techniques that can be implemented in 5G beamforming. In 3D MIMO, the antenna gain is combined as a sum of horizontal pattern and elevation pattern antenna gain. The angle of the main beam of the antenna up/below the horizontal plane is called antenna tilt 121. FIG. 1B also illustrates two wireless devices 111, 113 having the same azimuth angle (not shown). That is, they share the identical horizontal beam direction. Two different vertical beams with different tilt angles (121, 123) can be formed through different vertical power weights on the antenna elements. Thus, different beam directions can be achieved for the two specific wireless devices.

Figure 2A:
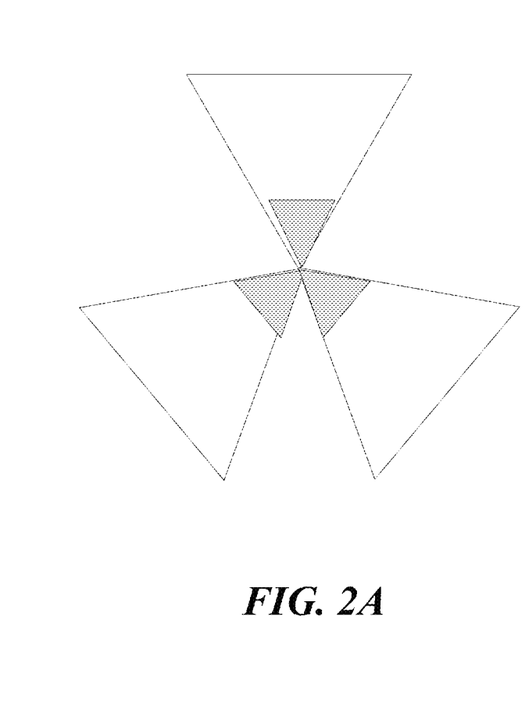
FIG. 2A illustrates an ideal configuration in which aggregation candidates corresponding to bands and/or cells are precisely aligned.
Figure 2B:
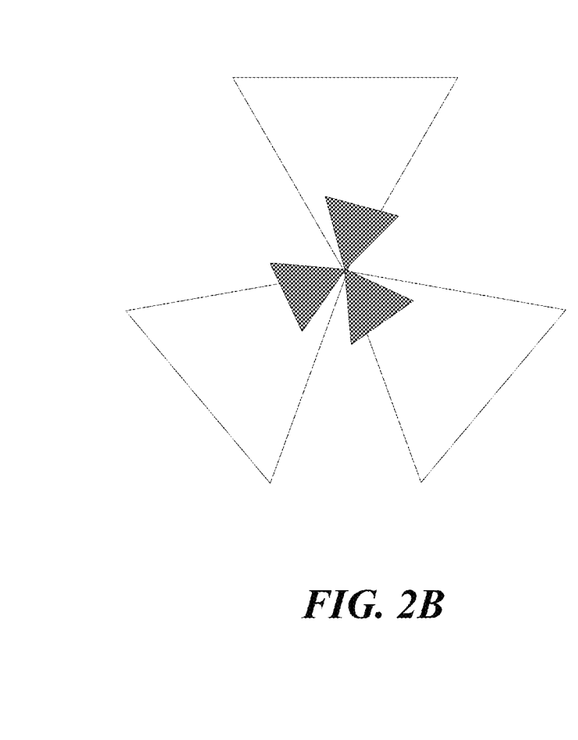
FIG. 2B illustrates the actual misalignment between the aggregation candidates and the bands and cells.

To achieve optimal customer experiences, a high level of precision and accuracy of planning and deployment is needed to determine what additional resources are to be injected into the network systems. Once the network systems are configured, a high level of confidence of the actual network state being consistent (or "in harmony") with the configurations is also required. Conventionally, such level of accuracy and precision is difficult to achieve. Engineering teams have to dedicate financial and time resources to audit and correct unexpected deployment configurations. A certain level of inaccuracy may still exit in the system even after laborious effort, leading to signal deterioration and usage drop. FIGS. 2A-B are schematic diagrams illustrating an example of misalignment between the intended configuration and the actual deployment. FIG. 2A illustrates an ideal configuration in which aggregation candidates corresponding to bands and/or cells are precisely aligned to achieve the largest aggregation window. FIG. 2B illustrates a misalignment between the aggregation candidates and the bands and cells in the actual deployed network resources, leading to bandwidth loss and impact of user experiences.

The patent document discloses techniques that can be implemented to provide automated auditing of the network system so as to determine if discrepancies between the actual states and the intended configurations exist in the network systems. In some embodiments, the disclosed techniques can be implemented as a Network State Harmony Auditor (NeSHA) system deployed at least partially in the core network. The NeSHA system can be configured to build an analytical model of the intended network behavior, audit the actual network behavior, update analytical model of to detect deviations, and trigger adjustments if needed so as to harmonize the reality of the network conditions against the expectations from the configurations.

Figure 3A:
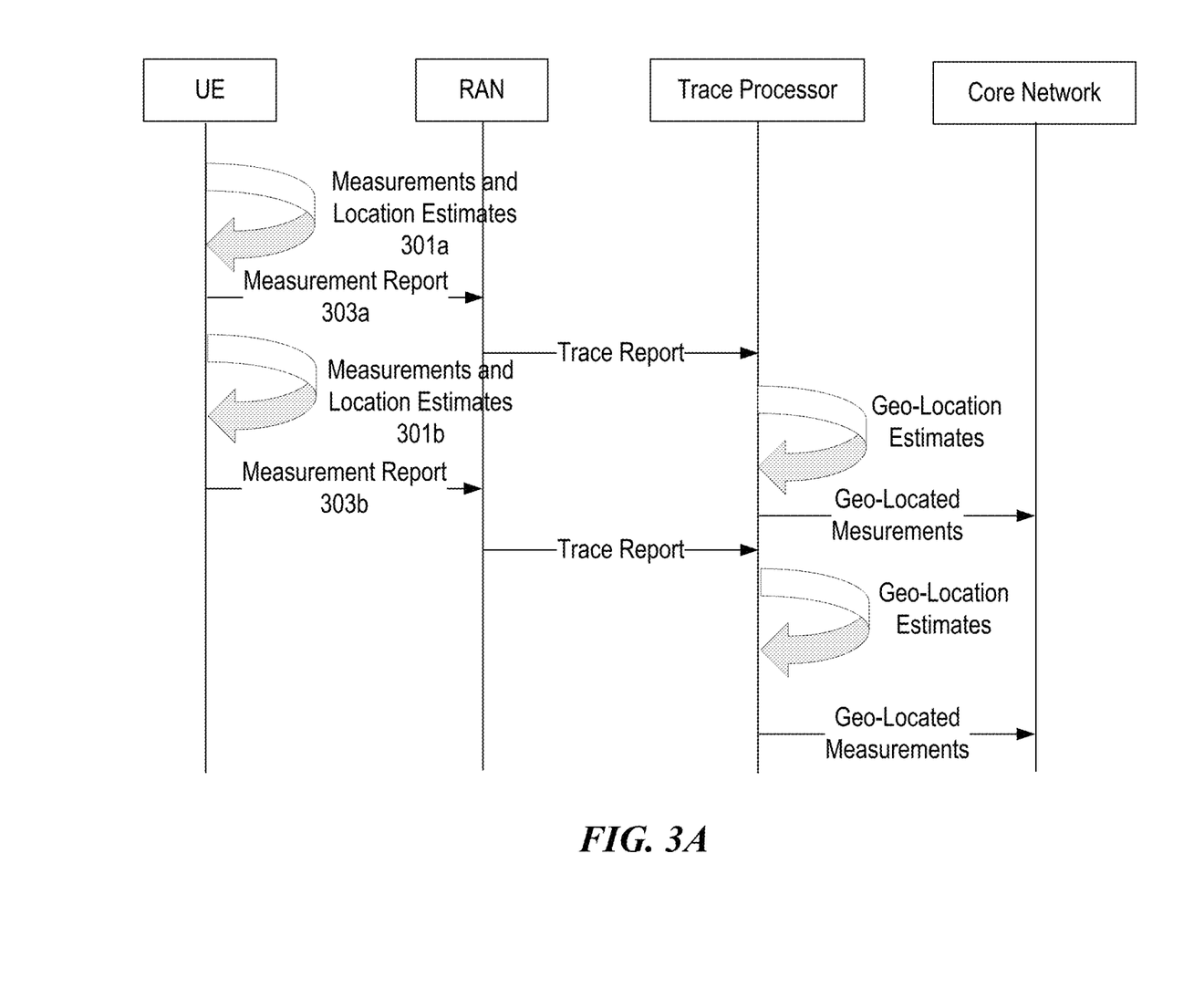
FIG. 3A illustrates an example sequence chart of transmitting measurement results to the core network in accordance with one or more embodiments of the present technology.

FIG. 3A illustrates an example sequence chart of transmitting measurement results to the core network in accordance with one or more embodiments of the present technology. When a User Equipment (UE) establishes a connection with a Radio Access Node (RAN), such as an eNB in 4G networks for a gNB in 5G networks, the UE can be configured to perform various measurements (301a, 301b), either periodically or aperiodically, based on the mobility trigger and/or policy settings. The measurement configuration can be included in the Radio Resource Control (RRC) Reconfiguration message or the RRC Resume message. Upon being configured, the UE can perform the measurements based on reference signals and report the measurement results (303a, 303b) to the RAN (also referred to as the base station). The measurement results include but are not limited to measurement results per Synchronization Signal (SS)/physical Broadcast Channel (PBCH) block and/or measurement results per Channel State Information (CSI) Reference Signal (RS). Each UE also performs location estimates using Global Positioning system (GPS) data. Uncorrected positions determined from GPS satellite signals produce accuracies in the range of 50 to 100 meters. When using correction techniques such as the differential correction, the position accuracy can be within 5 meters or less.

The RAN processes the measurement reports received from the UE and can adjust network access configurations accordingly. The RAN can also forward the measurement results to a separate network function, such as the Trace Processor. As shown in FIG. 3A, the Trace Processor can be implemented as a session trace system that receives periodic trace reports (e.g., measurements) from the RAN and consolidates the reported data based on estimated geo-locations. For example, the Trace Processor can group measurement reports from UEs that are located in the same geo-location area or in proximity to each other. The Trace Processor then transmits the geo-located trace events to the core network for further processing. In some embodiments, the Trace Processors can be deployed closer to the cell edges for more prompt and complete collection of the measurement results.

Figure 3B:
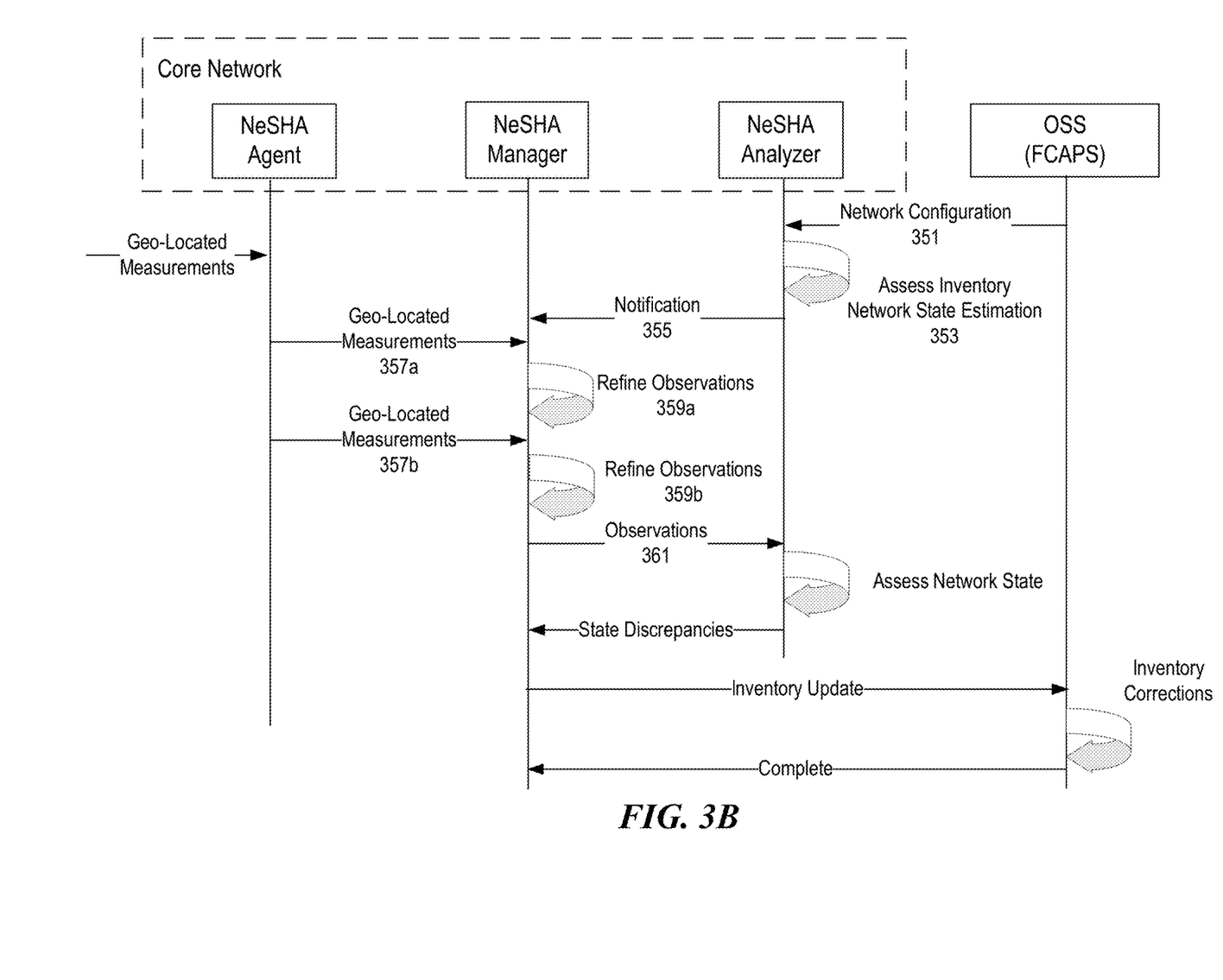
FIG. 3B illustrates an example sequence chart of network state auditing in accordance with one or more embodiments of the present technology.

FIG. 3B illustrates an example sequence chart of network state auditing in accordance with one or more embodiments of the present technology. Within the core network, different NeSHA functions can be deployed to enable the automated auditing of the network conditions. As shown in FIG. 3B, The Operations Support Systems (OSS) or the Fault, Configuration, Accounting, Performance, and Security (FCAPS) management function can first configure a centralized NeSHA Analyzer in Operation 351. The NeSHA Analyzer is configured to, in Operation 353, assess inventory details (e.g., what existing network resources are available and/or what new resources can be added) and estimate the expected network behavior and user experience models. For example, the NeSHA Analyzer can build a model for the expected network behavior given parameters such as a number of frequency bands supported by the network, a number of available cells, and/or beam characteristics for each of the available cells (e.g., the power levels of the beams, the azimuth angles and/or the tilt angles of the beams). The NeSHA Analyzer also sends notification messages (Operation 355) to one or more NeSHA managers that are configured to process the measurement reports.

In some embodiments, one or more NeSHA agents can be deployed closer to the Trace Functions to receive and forward the geo-located measurements to the one or more NeSHA managers, either periodically or aperiodically (Operation 357a, 357b). Each NeSHA manager can build an analytical model for the network observations based on the collected measurement reports. The observations can be refined (Operation 359a, 359b) as measurements are collected.

The NeSHA Manager then reports the observations to the NeSHA Analyzer at Operation 361. The NeSHA Analyzer compares the theoretical models that it has derived with the received observations from the NeSHA manager(s) to determine whether there is a state discrepancy. If one or more discrepancies are detected, the NeSHA Analyzer notifies the NeSHA manager(s), and the NeSHA manager(s) can send a request to the OSS/FCAPS to trigger an inventory update. In some embodiments, the update can be performed automatically. For example, certain advanced antenna systems allow variable electrical tilt and can be adjusted using a Remote Electrical Tilt (RET) actuator to the antenna. In some embodiments, the update can be performed by dispatching engineering teams to the physical sites (e.g., to add additional network resources, replace or examine existing physical equipment, etc.).

In the example shown in FIG. 3B, there functions (e.g., NeSHA manager and NeSH Analyzer) can be distributed nodes in the core network. For example, NeSHA analyzer is a centralized sever configured to model the expected network behavior, while multiple NeSHA managers can be distributed across the core network for the observation of the actual network conditions. In some embodiments, the NeSHA manager and the NeSHA analyzer can be consolidated into a single centralized server to enable centralized processing of the observations and the models.

Figure 4A:
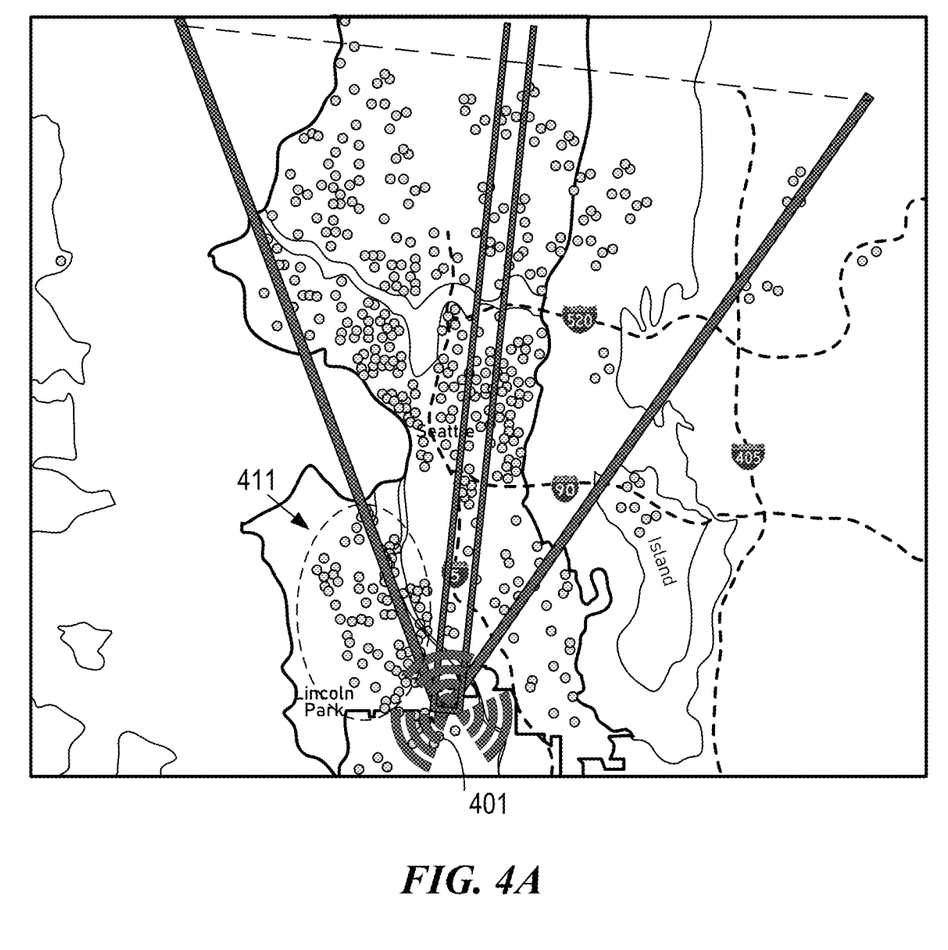
FIG. 4A illustrates a top view of an aggregation area with a corresponding azimuth angle in accordance with one or more embodiments of the present technology.
Figure 4B:
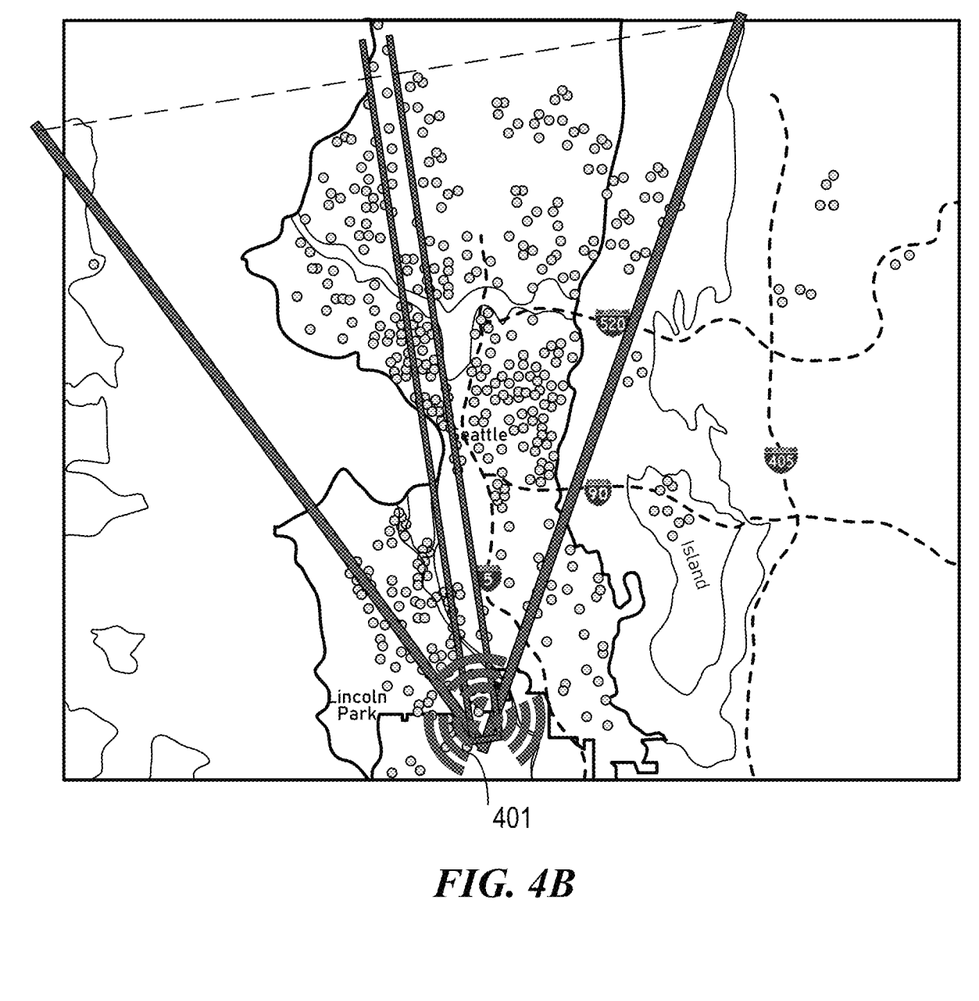
FIG. 4B illustrates a top view of an adjusted aggregation area with a corresponding azimuth angle in accordance with one or more embodiments of the present technology.

FIGS. 4A-4B are schematic diagrams illustrating an example of adjustments that can be made in response to the network state auditing result in accordance with one or more embodiments of the present technology. FIG. 4A illustrates a top view of an aggregation area with a corresponding azimuth angle (tilt is not visible) in accordance with one or more embodiments of the present technology. The cell is configured with a set of parameters to operate in an expected state 401 for providing carrier aggregation to user devices. Given the configured set of parameters, for example, X % of the served user devices are expected to leverage CA to gain wider bandwidth, where X % is a predetermined threshold (e.g., 90%). However, various factors have caused the actual azimuth angle of the cell to deviate from the configuration—a lower-than-expected number of user devices (that is, lower than or equal to X %) can actually leverage CA in the transmissions.

This discrepancy is reflected in the measurement reports collected from the user devices, and can be detected and corrected using the network auditing system disclosed herein. For example, as shown in FIG. 4A, a number of user devices 411 report undesirable measurement results. The NeSHA manager, upon receiving the measurement results via the access node(s) and/or the NeSHA agent(s), can refine its observed network conditions and report the observation to the NeSHA Analyzer. The NeSHA Analyzer compares the configured network state 401 with the actual measured aggregation state, and determines that adjustment of the network resources (e.g., antennas) is needed. In this particular example, as shown in FIG. 4B, the antenna elements can be automatically adjusted (e.g., the azimuth angle is adjusted) to align with the expected state 401 and to ensure that at least X % of the served user devices can leverage the available CA.

Figure 5:
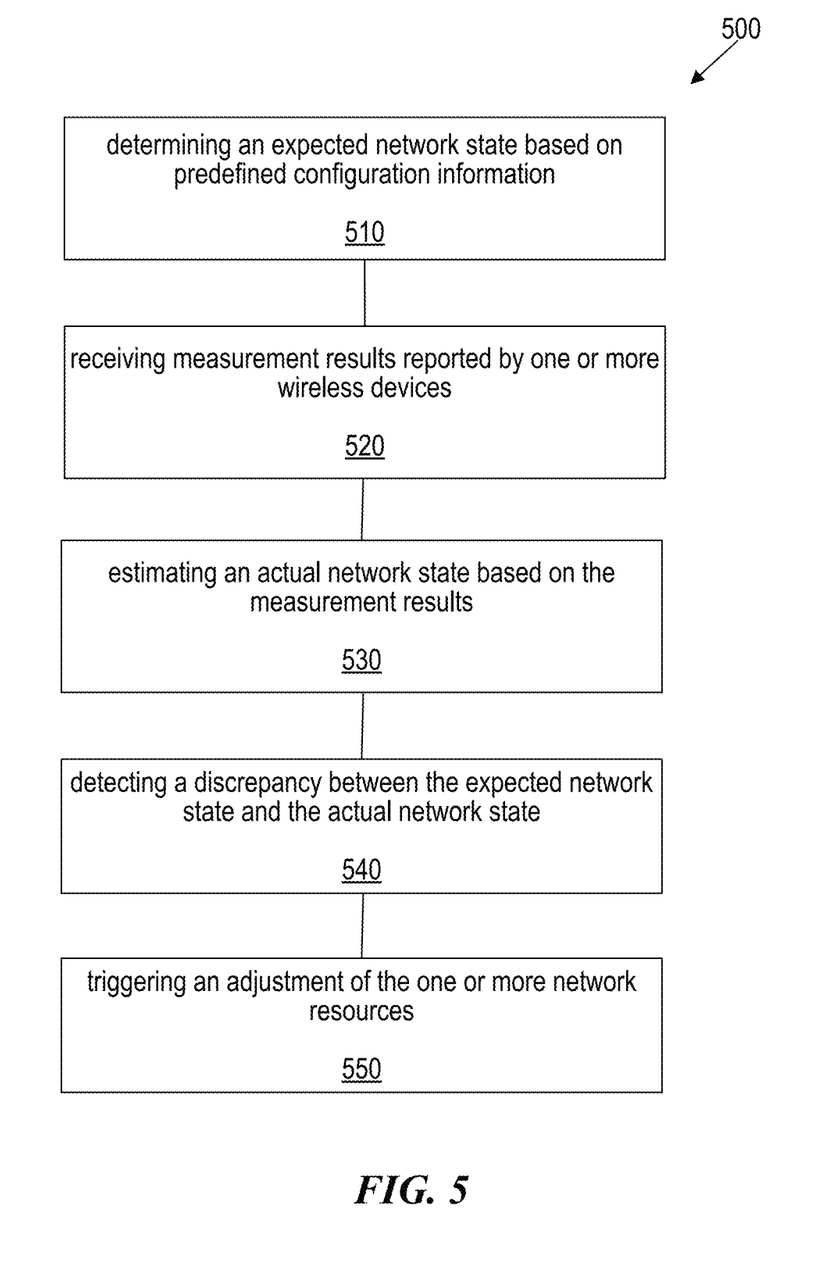
FIG. 5 is a flowchart representation of a method for wireless communication in accordance with one or more embodiments of the present technology.

FIG. 5 is a flowchart representation of a method 500 for wireless communication in accordance with one or more embodiments of the present technology. The method 500 includes, at operation 510, determining, by a network auditing system, an expected network state based on predefined configuration information of one or more network resources. The method 500 includes, at operation 520, receiving, by the network auditing system, measurement results reported by one or more wireless devices via at least one radio access node. The method 500 includes, at operation 530, estimating, by the network auditing system, an actual network state based on the measurement results reported by one or more wireless devices. The method 500 includes, at operation 540, detecting a discrepancy between the expected network state and the actual network state. The method 500 also includes, at operation 550, triggering an adjustment of the one or more network resources according to the predefined configuration based on the detected discrepancy.

In some embodiments, the network auditing system comprises at least a first node (e.g., the NeSHA Analyzer) configured to determine the expected network state and a second node (e.g., the NeSHA manager) configured to estimate the actual network state. In some embodiments, the network auditing system further comprises one or more agent nodes (e.g., the NeSHA agents) to relay the measurement results from the at least one radio access node to the second node of the network auditing system.

In some embodiments, the measurement results are arranged according to geo-locations of the one or more wireless devices so as to allow the network auditing system coverage of features (e.g., carrier aggregation) for user devices in a particular geo-location. In some embodiments, the measurement results reported by one or more wireless devices are received periodically by the network auditing system. In some embodiments, the measurement results comprise measurements performed per Synchronization Signal (SS)/physical Broadcast Channel (PBCH) block or per Channel State Information (CSI) Reference Signal (RS). In some embodiments, the predefined configuration information comprises at least one of: a number of supported frequency bands, a number of available cells, or beam characteristics for each of the available cells (such as the power levels, the azimuth angles, and the tilt angles).

Wireless Communications System

Figure 6:
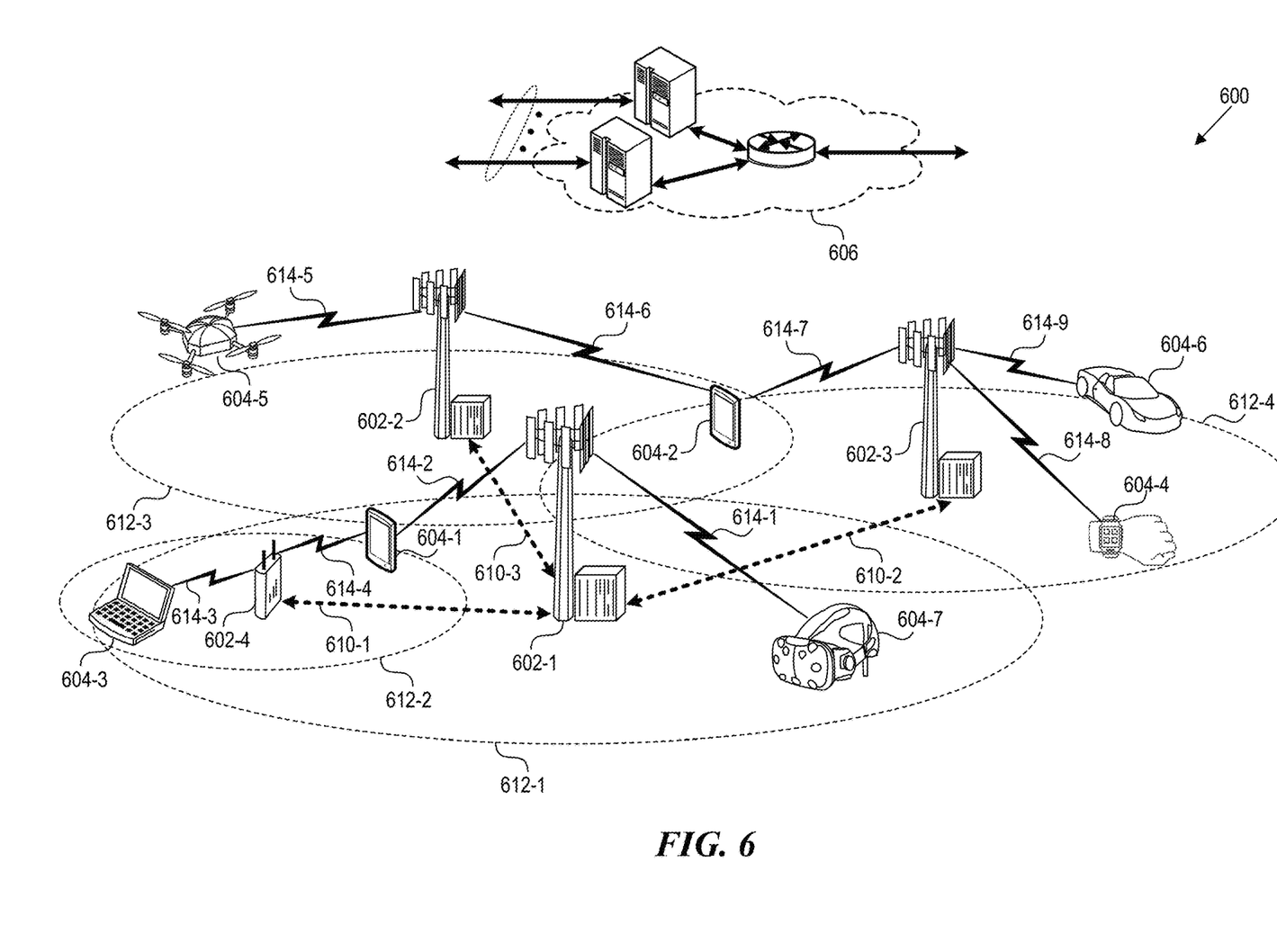
FIG. 6 is a diagram that illustrates a wireless telecommunication network in which aspects of the disclosed technology are incorporated.

FIG. 6 is a diagram that illustrates a wireless telecommunication network 600 ("network 600") in which aspects of the disclosed technology are incorporated. The network 600 includes base stations 602-1 through 602-4 (also referred to individually as "base station 602" or collectively as "base stations 602"). A base station is a type of network access node (NAN) that can also be referred to as a cell site, a base transceiver station, or a radio base station. The network 600 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 600 formed by the network 600 also include wireless devices 604-1 through 604-7 (referred to individually as "wireless device 604" or collectively as "wireless devices 604") and a core network 606. The wireless devices 604-1 through 604-7 can correspond to or include network 600 entities capable of communication using various connectivity standards. For example, a 5G communication channel can use millimeter wave (mmW) access frequencies of 28 GHz or more. In some implementations, the wireless device 604 can operatively couple to a base station 602 over a long-term evolution/long-term evolution-advanced (LTE/LTE-A) communication channel, which is referred to as a 4G communication channel.

The core network 606 provides, manages, and controls security services, user authentication, access authorization, tracking, Internet Protocol (IP) connectivity, and other access, routing, or mobility functions. The base stations 602 interface with the core network 606 through a first set of backhaul links (e.g., S1 interfaces) and can perform radio configuration and scheduling for communication with the wireless devices 604 or can operate under the control of a base station controller (not shown). In some examples, the base stations 602 can communicate with each other, either directly or indirectly (e.g., through the core network 606), over a second set of backhaul links 610-1 through 610-3 (e.g., X1 interfaces), which can be wired or wireless communication links.

The base stations 602 can wirelessly communicate with the wireless devices 604 via one or more base station antennas. The cell sites can provide communication coverage for geographic coverage areas 612-1 through 612-4 (also referred to individually as "coverage area 612" or collectively as "coverage areas 612"). The geographic coverage area 612 for a base station 602 can be divided into sectors making up only a portion of the coverage area (not shown). The network 600 can include base stations of different types (e.g., macro and/or small cell base stations). In some implementations, there can be overlapping geographic coverage areas 612 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 600 can include a 5G network 600 and/or an LTE/LTE-A or other network. In an LTE/LTE-A network, the term eNB is used to describe the base stations 602, and in 5G new radio (NR) networks, the term gNBs is used to describe the base stations 602 that can include mmW communications. The network 600 can thus form a heterogeneous network 600 in which different types of base stations provide coverage for various geographic regions. For example, each base station 602 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 600 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 600 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 600 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 604 and the base stations 602 or core network 606 supporting radio bearers for the user plane data. At the Physical (PHY) layer, the transport channels are mapped to physical channels.

Wireless devices can be integrated with or embedded in other devices. As illustrated, the wireless devices 604 are distributed throughout the system 600, where each wireless device 604 can be stationary or mobile. For example, wireless devices can include handheld mobile devices 604-1 and 604-2 (e.g., smartphones, portable hotspots, tablets, etc.); laptops 604-3; wearables 604-4; drones 604-5; vehicles with wireless connectivity 604-6; head-mounted displays with wireless augmented reality/virtual reality (ARNR) connectivity 604-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 604-1, 604-2, 604-3, 604-4, 604-5, 604-6, and 604-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 600 equipment at the edge of a network 600 including macro eNBs/gNBs, small cell eNBs/gNBs, relay base stations, and the like. A wireless device can also communicate with other wireless devices either within or outside the same coverage area of a base station via device-to-device (D2D) communications.

The communication links 614-1 through 614-9 (also referred to individually as "communication link 614" or collectively as "communication links 614") shown in network 600 include uplink (UL) transmissions from a wireless device 604 to a base station 602, and/or downlink (DL) transmissions from a base station 602 to a wireless device 604. The downlink transmissions can also be called forward link transmissions while the uplink transmissions can also be called reverse link transmissions. Each communication link 614 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 614 can transmit bidirectional communications using frequency division duplex (FDD) (e.g., using paired spectrum resources) or Time division duplex (TDD) operation (e.g., using unpaired spectrum resources). In some implementations, the communication links 614 include LTE and/or mmW communication links.

In some implementations of the network 600, the base stations 602 and/or the wireless devices 604 include multiple antennas for employing antenna diversity schemes to improve communication quality and reliability between base stations 602 and wireless devices 604. Additionally or alternatively, the base stations 602 and/or the wireless devices 604 can employ multiple-input, multiple-output (MIMO) techniques that can take advantage of multi-path environments to transmit multiple spatial layers carrying the same or different coded data.

Computer System

Figure 7:
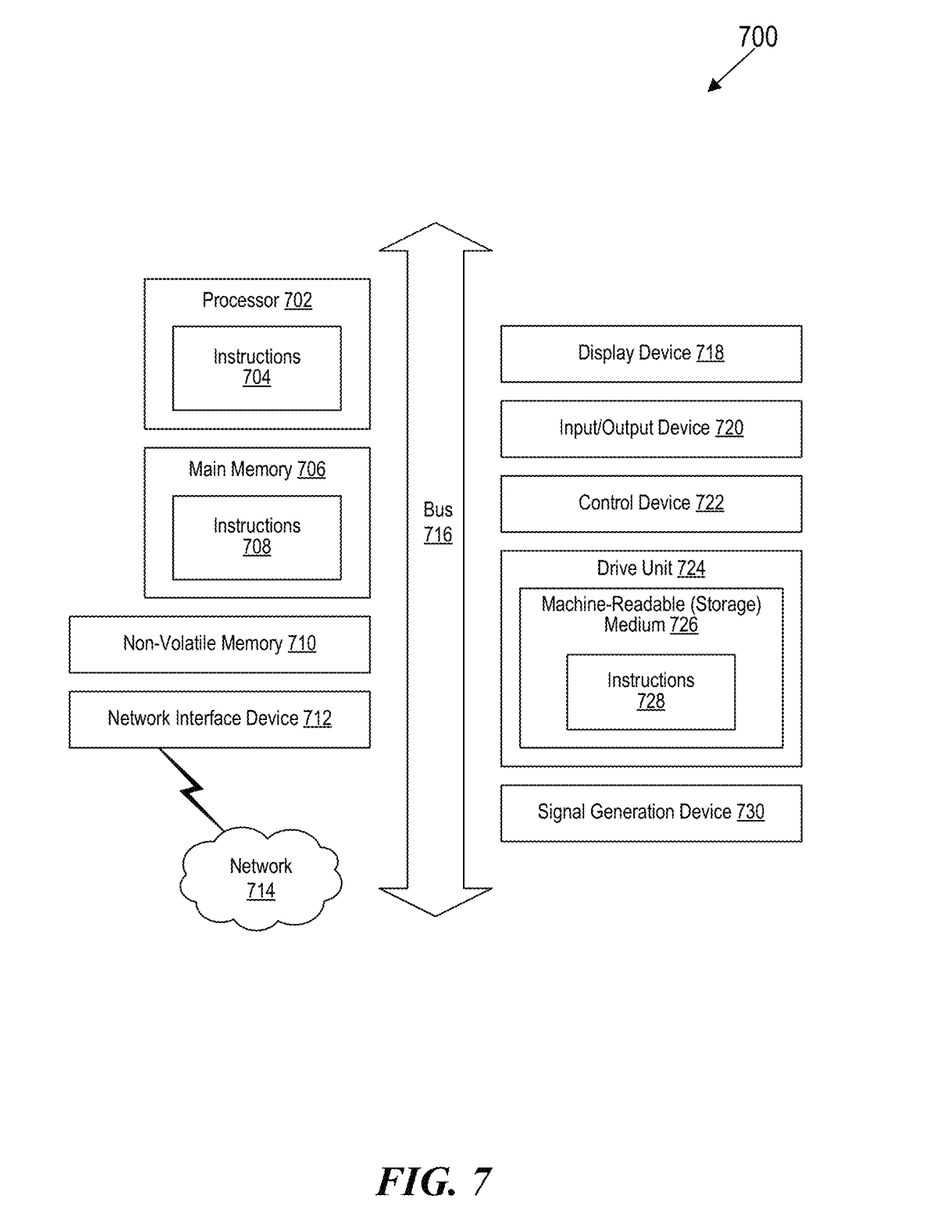
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

It is thus appreciated that the techniques disclosed herein can be implemented in various embodiments of dual-/multi-connectivity to single-connectivity transitions to ensure that carrier aggregation, if previously have been adopted, can be restored so as to provide optimal bandwidth and transmission rates for the UEs.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. An auditing system deployed in a core network to facilitate wireless communications, comprising:
   a first network node that is configured to:
      receive measurement results reported by one or more wireless devices via at least an access node,
      estimate an actual network condition based on the measurement results, and
      report the estimated actual network condition to a second network node in the core network;
   the second network node that is configured to:
      receive configuration information from an operating support system configuring one or more parameters indicating an expected network condition,
      derive, by the second network node, the expected network condition based on the one or more parameters,
      receive, by the second network node from the first network node, the actual network condition based on the measurement results, and
      transmit, by the second network node to the first network node, a discrepancy between the expected network condition and the actual network condition;
   wherein the first network node is further configured to notify the operating support system upon receiving the discrepancy between the expected network condition and the actual network condition.

2. The system of claim 1, further comprising:
   one or more agent nodes located in proximity to an edge of the core network configured to:
      receive the measurement results that are reported by the one or more wireless devices via one or more access nodes; and
      forward the measurement results to the first network node.

3. The system of claim 1, wherein the measurement results are arranged according to geo-locations of the one or more wireless devices.

4. The system of claim 1, wherein the first network node is configured to periodically receive the measurement results reported by the one or more wireless devices.

5. The system of claim 1, wherein the measurement results comprise measurements performed per Synchronization Signal (SS)/physical Broadcast Channel (PBCH) block or per Channel State Information (CSI) Reference Signal (RS).

6. The system of claim 1, wherein the one or more parameters comprise at least one of: a number of supported frequency bands, a number of available cells, or beam characteristics for each of the available cells.

7. The system of claim 1, wherein the second network node is a centralized network node configured to analyze the discrepancy between the expected network condition and the actual network condition.

8. The system of claim 1, wherein the second network node is configured to:
   analyze existing network resources to determine what resources are available.

9. The system of claim 1, wherein the second network node is configured to derive the expected network condition based on:
   constructing a model represent an expected network behavior;
   determining the expected network condition by providing the one or more parameters to the model.

10. The system of claim 1, wherein the first network node is configured to notify the operating support system to trigger an update of network resources.

11. The system of claim 1, wherein the expected network condition comprises an expected usage ratio of carrier aggregation.

12. A non-transitory, computer-readable storage medium comprising instructions recorded thereon that, when executed by a system that comprises multiple network nodes each having one or more processors, cause the system to:
   receive, by a first network node of the system, measurement results reported by one or more wireless devices via at least an access node,
   estimate, by the first network node of the system, an actual network condition based on the measurement results, report the estimated actual network condition to a second network node of the system, transmit, by the second network node to the first network node upon the second network node receiving the estimated actual network condition, a discrepancy between an expected network condition and the actual network condition, wherein the expected network condition is derived by the second network node based on one or more parameters received from an operating support system, and notifying, by the first network node upon receiving the discrepancy between the expected network condition and the actual network condition, the operating support system to trigger an update of network resources.

13. The non-transitory, computer-readable storage medium of claim 12, wherein the instructions, when executed by the system, cause the system to:

receive, by one or more agent nodes of the system located in proximity to an edge of a core network, the measurement results that are reported by the one or more wireless devices via one or more access nodes; and forward the measurement results to the first network node by the one or more agent nodes.

14. The non-transitory, computer-readable storage medium of claim 12, wherein the measurement results are arranged according to geo-locations of the one or more wireless devices.

15. The non-transitory, computer-readable storage medium of claim 12, wherein the instructions, when executed by the system, cause the system to:

periodically receive, by the first network node, the measurement results reported by the one or more wireless devices.

16. The non-transitory, computer-readable storage medium of claim 12, wherein the measurement results comprise measurements performed per Synchronization Signal (SS)/physical Broadcast Channel (PBCH) block or per Channel State Information (CSI) Reference Signal (RS).

17. The non-transitory, computer-readable storage medium of claim 12, wherein the one or more parameters comprise at least one of: a number of supported frequency bands, a number of available cells, or beam characteristics for each of the available cells.

18. The non-transitory, computer-readable storage medium of claim 12, wherein the instructions, when executed by the system, cause the system to:

analyze the discrepancy between the expected network condition and the actual network condition.

19. The non-transitory, computer-readable storage medium of claim 12, wherein the instructions, when executed by the system, cause the system to:

analyze existing network resources to determine what resources are available.

20. The non-transitory, computer-readable storage medium of claim 12, wherein the expected network condition comprises an expected usage ratio of carrier aggregation.

* * * * *